United States Patent Office 3,027,311
Patented Mar. 27, 1962

3,027,311
METHOD FOR RADIATION GRAFT COPOLYMERIZATION OF N-VINYL LACTAM MONOMERS ON ACRYLONITRILE POLYMER SUBSTRATES
Charles A. Levine and Teddy G. Traylor, Concord, Calif., assignors to The Dow Chemical Company, Midland, Mich., a corporation of Delaware
No Drawing. Filed Sept. 13, 1957, Ser. No. 683,685
18 Claims. (Cl. 204—154)

The present invention relates to an improved method for forming extremely advantageous and highly desirable compositions consisting of graft copolymers of various N-vinyl lactam monomers, particularly N-vinyl pyrrolidone, on acrylonitrile polymer substrates, particularly polyacrylonitrile, under the influence of high energy radiation.

It is the principal object of the present invention to provide better procedure, by way of an improved method, for enhancing the dyeability or receptivity to various dyestuffs of acrylonitrile polymer substrates, particularly those substrates consisting of acrylonitrile polymers that contain in the polymer molecule at least about 80 percent by weight of acrylonitrile and especially polyacrylonitrile.

It is a particular object of the present invention to improve the dye-receptivity of acrylonitrile polymer substrates by forming graft copolymers thereon of various N-vinyl lactam monomers, particularly N-vinyl pyrrolidone.

It is a special object of the invention to enhance the dye-receptivity of acrylonitrile polymer substrates that are in the form of various shaped articles, including filaments, fibers, films and the like and cognate structures.

A specific object of the invention is to improve the dyeability of shaped articles of acrylonitrile polymers with graft copolymers of vinyl lactam monomers by accomplishing the graft copolymerization while the acrylonitrile polymer substrate is in a water-hydrated or aquagel form or condition.

A primary object of the invention is to accomplish the foregoing intendments by the utilization of high energy radiation for effecting or influencing the desired graft copolymer formation.

A further object of the invention is to provide an improved method for improving the dyeability of acrylonitrile polymer substrates in a manner which may be closely and effectively controlled.

Another object of the invention is to accomplish the graft copolymerization of vinyl lactam monomers on acrylonitrile polymer substrates without degrading or deleteriously affecting either the physical properties or the visual appearance, including color, of the polymer substrate.

Yet another object of the invention is to accomplish the foregoing objects, including the utilization of high energy radiation for the desired graft copolymer formation, on an economical and generally attractive basis.

Further objects and corollary advantages and benefits of the present invention will be manifest in the ensuing description and specification.

Cursorily, and to emphasize its salient and essential features, the method of the present invention comprises contacting or impregnating an acrylonitrile polymer in aquagel condition (advantageously, a polyacrylonitrile aquagel that, preferably, is in the form of a shaped article such as a fiber, filament or film) with a solution, advantageously an aqueous solution, of an N-vinyl lactam monomer, beneficially N-vinyl pyrrolidone; then subjecting or exposing the so-impregnated or soaked acrylonitrile polymer aquagel to the influence of high energy irradiation that is applied under closely controlled conditions at a low rate of dosage until a relatively mild total dose has been obtained in and by the impregnated substrate and the desired graft copolymer has been formed on the acrylonitrile polymer substrate. In a preferred embodiment of the process, various additives may advantageously be employed and incorporated in the impregnating monomer solution in order to serve as wetting agents, reducing agents, and to control the acidity or pH condition of the monomer solution. In another highly desired embodiment of the process, which may be practiced with great advantage in conjunction with the foregoing, the temperature during radiation is closely controlled. After the graft copolymerization has been accomplished, the modified aquagel can be irreversibly dried, especially when it is in a shaped article form, in order to convert it to a final structure that is capable of being dyed readily with any of a wide variety of dyestuffs.

For purposes of specifically illustrating, without intending to thereby limit the invention, the following didactic examples are provided wherein, unless otherwise indicated, all parts and percentages are to be taken by weight.

EXAMPLE 1

Several samples of a salt-spun, wet-stretched acrylonitrile polymer in aquagel form were saturated with various aqueous solutions of monomeric N-vinyl pyrrolidone. Each of the solutions, which had independently differing monomer concentrations, contained about 0.5 percent by weight of tribasic sodium phosphate as a wetting agent in order to ameliorate the impregnation of the vinyl lactam monomer into the aquagel while, at the same time, serving to maintain the impregnating solution in a slightly basic condition.

The polyacrylonitrile aquagel fiber, which contained about two parts by weight of water in the gel phase to each part by weight of dry polymer in the aquagel structure, had been obtained by extruding a spinning solution comprised of about 10 parts of polyacrylonitrile dissolved in about 90 parts of a 60 percent aqueous solution of zinc chloride into an aqueous coagulating bath that contained about 42 percent of zinc chloride dissolved therein. A multiple filament tow was prepared in the spinning operation by extruding the spinning solution through a spinnerette having 750 round orifices, each of about 6 mil diameter. The coagulated tow bundle was washed substantially free from salt after being withdrawn from the coagulating bath, and, prior to being impregnated with the monomeric vinyl lactam solution, had been wet-stretched for purposes of orientation to a total stretched length that was about twelve times its original extruded length.

The impregnation with the aqueous solutions of the vinyl lactam monomer was performed by passing continuous or endless lengths of the tow through a bath of monomer solution which was protected from the air by being blanketed under a nitrogen atmosphere. After impregnation, the saturated aquagel fiber was handled in nitrogen until it was subsequently irradiated by exposure at room temperature to a high energy, X-ray radiation beam from a Van de Graaff electrostatic generator operating under a potential of two million electron volts with a 250 microampere beam current impinging on a Tungsten target. The irradiation was also performed in a nitrogen atmosphere. The impregnation of the tow bundle and its immediately subsequent passage through the beam was continuously performed on the endless length of the moving tow. The monomer impregnated fiber was subjected to the high energy at a dose rate of about 14,000 roentgen equivalent physicals (rep) per minute. After irradiation, the samples were rinsed, irreversibly dried to convert them from the aquagel condition to finished fiber form and heat set at 150° C. for 5 minutes. The finally obtained fibers were of about three denier size and had a tenacity of about 3.5 grams per denier, a wet strength of about 2.5 grams per denier and an elongation of about 35 percent.

Each of irradiated graft copolymer-containing fibers was then dyed with 4 percent Calcodur Pink 2BL for about one hour at the boil in a sodium sulfate-containing bath according to conventional procedure in which the dyestuff was present in the bath in an amount that was equal to about 4 percent of the fiber; the sodium sulfate was present in the bath in an amount equal to about 15 percent of the fiber; and ratio of bath-to-fiber was about 30:1.

Calcodur Pink 2BL is a well known direct type of dye having a color index of 353. It is commercially obtainable from the Calco Chemical Division of American Cyanamid Company. This distinct variety of direct dyestuff is also available under other designations from several different manufacturers. It is presumed, upon the basis of reasonable information and belief, to be the sodium salt of 3,3-disulphodiphenylurea-4,4'-diazobis-2-amino-8-naphthol-6-sulphonic acid and to have the following structural arrangement:

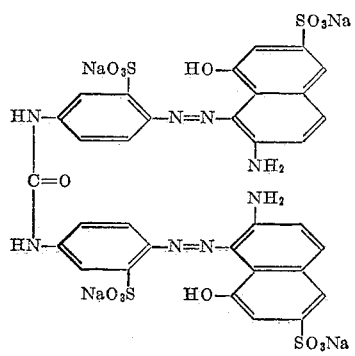

Calcodur Pink 2BL

After being dyed, each sample was rinsed in water and dried for about 20 minutes at 80° C. The dye-receptivity of each fiber sample was evaluated by spectrophotometrically measuring the monochromatic light having a wave length of about 520 millimicrons from a standard source that was reflected from each sample after it had been dyed with 4 percent Calcodur Pink 2BL. A numerical reflectance value was thereby obtained along a numerical scale from 0 to 100. The reflectance value in each case represented the relative comparison of the amount of light that was reflected from the dyed sample with that which was reflected from a standard white tile reflector having an arbitrarily assigned reflectance value according to the numerical scale used of about 316.

As is well known in the art, lower reflectance values are an indication of better dye-receptivity in a given fiber sample. For example, a reflectance value of about 20-25 for acrylonitrile polymer synthetic fibers dyed with 4 percent Calcodur Pink 2BL is generally considered by those skilled in the art to represent a degree of dye-receptivity that readily meets or exceeds the most rigorous practical requirements and is ordinarily assured of receiving general commercial acceptance and approval. The percentage of N-vinyl pyrrolidone graft copolymer that was formed on the polyacrylonitrile substrate was determined by infrared spectroscopy techniques. In the following tabulation there is set forth a summary of the experimental results which were obtained with each of the samples. The symbol "VP" stands for N-vinyl pyrrolidone monomer and the expression "PVP" indicates N-vinyl pyrrolidone graft copolymer.

Table 1
FORMATION AT ROOM TEMPERATURE UNDER RADIATION OF N-VINYL PYRROLIDONE GRAFT COPOLYMERS ON POLYACRYLONITRILE FIBERS

| Sample No. | Concentration VP, percent | Radiation Dose in Reps. | Dyed Color of Irradiated Fiber | Reflectance Value | Percent PVP in Irradiated Fiber |
|---|---|---|---|---|---|
| A1 | 1 | 0 | None | >100 | 0 |
| A2 | 1 | 25,000 | Light | >100 | 2.85 |
| A3 | 1 | 50,000 | do | >100 | 4.16 |
| A4 | 1 | 100,000 | do | >100 | 3.4 |
| A5 | 5 | 0 | None | >100 | 0 |
| A6 | 5 | 25,000 | Light | 70 | 3.82 |
| A7 | 5 | 50,000 | Medium | 55 | 7.50 |
| A8 | 5 | 100,000 | do | 30 | 10.12 |
| A9 | 10 | 0 | None | >100 | 0 |
| A10 | 10 | 25,000 | Medium | 45 | 6.79 |
| A11 | 10 | 50,000 | do | 30 | 12.32 |
| A12 | 10 | 100,000 | Dark | 9 | 16.19 |
| A13 | 98 | 0 | None | >100 | 0 |
| A14 | 98 | 25,000 | Light | 70 | 5.4 |
| A15 | 98 | 50,000 | Medium | 30 | 10.5 |
| A16 | 98 | 100,000 | Dark | 9 | 17.0 |

EXAMPLE 2

The procedure of Example 1 was identically repeated with several additional samples excepting to conduct the radiation at a temperature of 46° C. instead of at room temperature. The results are set forth in the following Table 2.

Table 2
FORMATION AT 46° C. UNDER IRRADIATION OF N-VINYL PYRROLIDONE GRAFT COPOLYMERS ON POLYACRYLONITRILE FIBERS

| Sample No. | Concentration VP, percent | Radiation Dose in Reps. | Dyed Color of Irradiation Fiber | Reflectance Value | Percent PVP in Irradiated Fiber |
|---|---|---|---|---|---|
| B1 | 10 | 30,000 | Medium | 50 | 8.20 |
| B2 | 10 | 50,000 | do | 35 | 7.40 |
| B3 | 10 | 75,000 | Dark | 12 | 10.45 |
| B4 | 20 | 50,000 | Medium | 19 | 11.25 |
| B5 | 20 | 75,000 | Dark | 9 | 16.0 |

EXAMPLE 3

Following the procedure of the first example and using a 10 percent aqueous solution of monomeric N-vinyl pyrrolidone, several additional samples were prepared. The temperature, however, at which the irradiation of each sample was conducted was varied. The results are set forth in the following Table 3.

Table 3
FORMATION AT VARIOUS TEMPERATURES UNDER IRRADIATION OF N-VINYL PYRROLIDONE GRAFT COPOLYMERS ON POLYACRYLONITRILE FIBERS

| Sample No. | Temperature of Irradiation, °C. | Radiation Dose in Reps. | Dyed Color of Irradiated Fiber | Reflectance Value |
|---|---|---|---|---|
| C1 | 20 | 0 | None | 100 |
| C2 | 20 | 10,000 | Light | 80 |
| C3 | 20 | 25,000 | Medium | 60 |
| C4 | 20 | 50,000 | do | 25 |
| C5 | 20 | 100,000 | Dark | 9 |
| C6 | 30 | 0 | None | 100 |
| C7 | 30 | 10,000 | Light | 80 |
| C8 | 30 | 25,000 | Medium | 55 |
| C9 | 30 | 50,000 | do | 20 |
| C10 | 30 | 100,000 | Dark | 9 |
| C11 | 47 | 0 | None | 100 |
| C12 | 47 | 10,000 | Light | 75 |
| C13 | 47 | 25,000 | Medium | 45 |
| C14 | 47 | 50,000 | Dark | 9 |
| C15 | 47 | 100,000 | do | 9 |

EXAMPLE 4

A sample of polyacrylonitrile aquagel fiber similar to that employed in Example 1 was impregnated with a 10 percent aqueous solution of N-vinyl pyrrolidone in accordance with the procedure set forth in the first example until the fiber was saturated with the aqueous solution. The sample was then irradiated in a high energy electron beam from a Van de Graaff generator operating at 2 million volts and one microampere beam current at a dose rate of 22,000 rep. per minute until a total dose of 57,800 rep. of electrons was obtained. After being dried, the resulting fiber sample had a reflectance value of 15 when dyed with 4 percent Calcodur Pink 2BL in the manner which is indicated in the foregoing. Another similarly impregnated sample was irradiated by electrons in accordance with the procedure set forth in Example 1 by X-rays from the Van de Graaff generator operating as defined in the first example to provide a dose rate of 14,000 rep. per minute until a total radiation dose of 63,500 rep. of X-ray radiation was obtained. The finally obtained graft copolymer-containing fiber had a reflectance value of 9 when dyed with 4 percent Calcodur Pink 2BL.

EXAMPLE 5

Another series of experiments was performed under the conditions set forth in Example 1, excepting to employ a 20 percent aqueous solution of monomeric N-vinyl pyrrolidone with 0.5 percent sodium tribasic phosphate incorporated therein as an additive for the same reasons divulged in the first example. Several different samples of the same polyacrylonitrile aquagel fiber as employed in the first example were utilized. The experiments provided basis for a comparison of the effects of different radiation dosages applied at varying rates. The results are set forth in the following Table 4.

*Table 4*

FORMATION UNDER DIFFERENT DOSAGES AT VARYING RATES OF IRRADIATION OF N-VINYL PYRROLIDONE GRAFT COPOLYMERS ON POLYACRYLONITRILE FIBERS

| Sample No. | Radiation Dose Rate, Rep./Min. | Radiation Dose in Reps. | Dyed Color In Irradiated Fiber | Reflectance Value | Percent PVP In Irradiated Fiber |
|---|---|---|---|---|---|
| D1 | 14,000 | 25,000 | Medium | 30 | 11.11 |
| D2 | 14,000 | 50,000 | Dark | 15 | 15.28 |
| D3 | 14,000 | 75,000 | ---do--- | 9 | 18.01 |
| D4 | 4,400 | 10,000 | Medium | 60 | 7.3 |
| D5 | 4,400 | 25,000 | ---do--- | 25 | 12.56 |

EXAMPLE 6

Following the general procedure of Example 1 with several samples of the same aquagel fiber and a 10 percent aqueous impregnating solution of the N-vinyl pyrrolidone monomer, a comparison was made of the effects of various additives incorporated in the monomer impregnating solution. The results are set forth in the following Table 5, wherein the particular additives that were utilized are identified. Each of the fiber samples tested were dyed in the indicated manner with Calcodur Pink 2BL.

*Table 5*

FORMATION USING VARIOUS ADDITIVES IN MONOMERIC IMPREGNATION SOLUTION UNDER IRRADIATION OF N-VINYL PYRROLIDONE GRAFT COPOLYMERS ON POLYACRYLONITRILE FIBERS

| Sample No. | Additive | Concentration of Additive, Percent | Radiation Dose in Reps. | Dyed Color of Irradiated Fibers | Reflectance Value |
|---|---|---|---|---|---|
| E1 | $NaHSO_3$ | 1 | 50,000 | Light | >100 |
| E2 | $NaHSO_3$ | 1 | 100,000 | ---do--- | >100 |
| E3 | $NaHSO_3$ | 1 | 250,000 | ---do--- | >100 |
| E4 | $NaHSO_3$ | 1 | 500,000 | ---do--- | >100 |
| E5 | $Na_2SO_4$ | 1 | 50,000 | ---do--- | 80 |
| E6 | $Na_2SO_4$ | 1 | 100,000 | Medium | 60 |
| E7 | $Na_2SO_4$ | 1 | 250,000 | ---do--- | 26 |
| E8 | $Na_2SO_4$ | 1 | 500,000 | Dark | 9 |
| E9 | $Na_2S$ | 1 | 50,000 | Light | >100 |
| E10 | $Na_2S$ | 1 | 100,000 | ---do--- | >100 |
| E12 | $Na_2S$ | 1 | 250,000 | ---do--- | >100 |
| E13 | $Na_2S$ | 1 | 500,000 | ---do--- | >100 |
| E14 | $NaNO_3$ | 1 | 100,000 | Medium | 25 |
| E15 | $Na_3PO_4$ | 1 | 100,000 | Dark | 9 |
| E16 | $NaCl$ | 0.5 | 100,000 | ---do--- | 9 |
| E17 | $ZnSO_4$ | 0.5 | 100,000 | ---do--- | 9 |
| E18 | $Na_2SO_3$ | 0.5 | 100,000 | ---do--- | 9 |
| E19 | $SnCl_4$ | 0.5 | 100,000 | Light | 75 |

EXAMPLE 7

Three samples of polyacrylonitrile aquagel fiber similar to that employed in the first example were independently impregnated with a 10 percent aqueous solution of monomeric N-vinyl pyrrolidone-containing 0.25 percent of sodium sulfite and 0.25 percent of sodium tribasic phosphate. The radiation of each sample was accomplished in the manner set forth in Example 1, using a radiation dose rate of about 14,000 rep. per minute at a temperature of 50° C. In the treatment of each of the samples, the monomeric impregnating bath for the aquagel tow was located outside the shielded area of the Van de Graaff generator. After being saturated with monomer, the tow was pulled through the shielding assembly into the radiation field. This technique was resorted to for purposes of minimizing or eliminating pre-polymerization of the monomeric N-vinyl pyrrolidone that was dissolved in the impregnating bath.

One of the samples was subject to a total radiation dosage of about 20,000 rep. It dyed to a medium shade with 4 percent Calcodur Pink 2BL and, after dyeing, had a reflectance value of about 19. The second sample was subjected to a total radiation dose of 30,000 rep. It dyed to a dark shade with 4 percent Calcodur Pink 2BL and had a reflectance value of about 11. The second sample was found to contain about 9.8 percent of the N-vinyl pyrrolidone graft copolymer on the polyacrylonitrile substrate. The third sample was given a total dose of 40,000 rep. It dyed to a dark shade with the Calcodur Pink 2BL and was found to have a reflectance value of about 10.

EXAMPLE 8

A wet-stretched polyacrylonitrile aquagel fiber was soaked in an aqueous 10 percent solution of monomeric N-vinyl pyrrolidone that had been flushed thoroughly by sparging with carbon dioxide. The monomer-saturated aquagel fiber was exposed to gamma radiation from a cobalt–60 source at a dose rate of about 1800 rep. per minute until a total dose of about 110,000 rep. of gamma radiation had been obtained in a one-hour period. The irradiated sample was rinsed, dried and heat set for 5 minutes at 150° C., then dyed with 4 percent Calcodur Pink 2BL. It was found to have a reflectance value of 13.

EXAMPLE 9

The impregnating procedure of Example 8 as repeated to obtain an N-vinyl pyrrolidone monomer saturated polyacrylonitrile aquagel fiber. The saturated fiber sample was exposed to electrons generated from a linear accelerator operating at a potential of 10.5 million electron volts until a total dosage of 230,000 rep. of electrons was obtained at a dose rate of 41,000 rep. per minute. The sample was rinsed, dried, heat set for 5 minutes at 150° C. and dyed with 4 percent Calcodur Pink 2BL. A reflectance value of 58 was observed in the dyed fiber sample.

Excellent results similar to the foregoing may also be achieved when other acrylonitrile polymer substrates are modified with graft copolymers of N-vinyl pyrrolidone and other N-vinyl lactam monomers, including N-vinyl caprolactam and other of the cognate N-vinyl lactam monomers that are known to the art, such as those which have been described and are involved in U.S. Patent Nos. 2,265,450; 2,371,804, and 2,335,454. As is apparent, the greatest advantage in the practice of the invention can generally be achieved when the acrylonitrile polymer substrate being modified is polyacrylonitrile. Although, as has been indicated and if so desired, various copolymers of acrylonitrile, especially fiber-forming copolymers, may be utilized.

If desired, as has also been indicated, the N-vinyl lactam monomer may be impregnated in the acrylonitrile polymer aquagel substrate without use of a solvent, despite the fact that it is generally more beneficial to prepare the monomeric impregnant in solution, especially in aqueous solution. Besides water, other solvents which have a swelling influence on acrylonitrile polymers; are capable of dissolving the N-vinyl lactam monomer being utilized; and which do not inhibit polymerization may be utilized. For example, ethanol, N-methyl pyrrolidone, dimethyl sulfoxide, dimethyl sulfone, and the like may be employed for dissolving the monomeric N-vinyl lactam. Likewise, aqueous mixtures of water miscible solvents may be similarly utilized. It is generally desirable to impregnate the acrylonitrile polymer with sufficient graft copolymer-forming monomer and to conduct the method of the invention so that between about 5 and 16 percent by weight, on a dry weight basis, taken on the resulting composition of the graft copolymer, is formed on the acrylonitrile polymer substrate. The indicated range of graft copolymer concentration is not an essential criticality. In many instances, satisfactory results may be obtained with more or less of the graft copolymer being formed. Furthermore, the amount of graft copolymer formed may also be found to vary with particular process conditions which may be involved that influence both the number of graft sites on the polymer substrate and the length of the graft copolymer side chains that are obtained.

As indicated in the foregoing, sodium sulfite ($Na_2SO_3$) and sodium tribasic phosphate ($Na_3PO_4$), are the preferred additives for use in the practice of the present invention. If desired, other inorganic salts or organic detergents besides those indicated may be utilized as wetting agents and other inorganic or organic reducing agents employed. It is generally advantageous to utilize between about 0.05 and 1 percent of the additive that are employed. Most of the additives that may be utilized are good wetting agents, reducing agents, alkalizing agents or combinations thereof. They provide a noticeable improvement, whether used separately or in any desired combination, at individual concentrations as low as 0.01 percent by weight, based on the weight of the impregnating solution, and seem to reach maximum effectiveness at concentrations between about 0.05 and 0.1 percent. As can be appreciated the wetting agents employed, such as the inorganic, water-soluble phosphate, sulphate or sulphite salts, function to reduce the surface tension of the monomeric impregnating solutions so as to facilitate and secure good and uniform penetration of the monomer into the aquagel. The reducing agents, such as the alkali metal sulphites and bisulphites or phosphites, serve to control the effect of residual oxygen or peroxides which may be present or that which may form in the system during irradiation. The alkalizing agents which are alkaline salts or alkaline buffers, such as alkali metal phosphates and sulphites, control the pH of the system being irradiated so as to provide the most beneficial and advantageous environment (as regards hydrogen ion concentration in the system) for accomplishment of the intended purpose.

It should be taken into account, of course, that the additives are most useful to utilize in connection with aqueous monomer impregnating solutions. The ultimate effect of the additives is to improve the depth and evenness of dyeability in the resulting product. In this connection, particularly when aqueous monomer solutions are being employed, the pH of the monomer solution should be maintained between about 5 and 11, advantageously above about pH 7 so that the monomer solution is of an alkaline nature. In this way, greatest preclusion of the formation of oxygen and hydrogen peroxide as a consequence of the irradiation of water may be achieved. A noticeable decrease in dyeability usually occurs when the monomer impregnating solution has a pH less than about 6. More advantageously, the pH of the monomer impregnating solution is between about 7 and 10, preferably about 8. Obviously, as will occur to those having the skill of their calling, the additive that is employed, regardless of its functional nature, must not be of the type that might inhibit the polymerization reaction. Thus, practically any wetting agent, reducing agent or base that does not have such an undesirable influence may be employed effectively as an additive in the practice of the present method.

It is generally desirable for the concentration of monomer in the impregnating solution, particularly when an aqueous impregnating solution is employed, to be between about 5 and 20 percent by weight, based on the weight of the solution. For most purposes, an aqueous solution of about 10 percent by weight of the dissolved monomer may be found satisfactory. As is apparent in the foregoing, higher concentrations of monomer in the impregnating solutions tend to lower the total radiation dose that is needed in order to achieve the same degree of dyeability in the graft copolymer-containing product. However, under such conditions, more of the graft copolymer is formed having the same level of dyeability, probably for the reason that shorter graft copolymer chains are effected when greater concentrations of the monomer are present.

It is generally preferable, in the practice of the present invention, to accomplish the graft copolymerization of the impregnated N-vinyl lactam monomer under the influence of the high energy radiation at a temperature in the range from about 20 to 60° C., preferably not in excess of about 50° C. At temperatures higher than the last mentioned value, the acrylonitrile polymer aquagel may frequently be found to undergo shrinkage and cause certain quantities of ungrafted homopolymer of the N-vinyl lactam monomer to be entrained in the structure. Generally, increasing the temperature during radiation, particularly within the indicated limits, provides a graft polymer product that dyes more evenly and deeply under given conditions. Thus, the dyeability of polyacrylonitrile fiber being modified with N-vinyl pyrrolidone is approximately equal for samples that have been subjected to a total dosage of about 100,000 rep. at about 20° C. and 50,000 rep. at 40° C., the result at 30° C. being about intermediate. The improvement in dyeability is considerably less substantial when the irradiation is conducted at the freezing point of water.

Practice of the present invention generally secures most desirable results when the graft copolymerization is conducted essentially or substantially in the absence of oxidation. Up to about 1 percent oxygen in the atmosphere that surrounds the substrate being modified can be tolerated at the expense of a slight increase in necessary total dose if an alkaline impregnating solution is employed or if the irradiation is accomplished at an elevated temperature. In this connection, it is generally not an advantage to pre-irradiate the polymer substrate which is to be modified into a graft copolymer. Relatively poorer dyeability is generally obtained in the resulting product when resort is made to such techniques.

The high energy radiation which is employed for inducing the graft copolymerization in the practice of the present invention is of the type which provides emitted particles or photons having an intrinsic energy of a magnitude which is greater than the planetary electron binding energies that occur in the graft copolymerizing materials. Such high energy radiation, as has been illustrated in the foregoing is conventionally available from various radioactive substances which provide beta or gamma radiation as, for example, various radioactive forms of elements, including cobalt-60 and cesium-137; nuclear reaction fission products and the like. If it is preferred, however, as has been indicated in the foregoing, high energy radiation from such sources as electron beam generators, including linear accelerators and resonant transformers; X-ray generators and the like may also be utilized. It is beneficial to employ the high energy radiation in a field of at least about 40,000 roentgens per hour intensity. A roentgen, as is commonly understood, is the amount of high energy radiation as may be provided in a radiation field which produces in one cubic centimeter of air at 0° C. and 760 millimeters of absolute mercury pressure, such a degree of conductivity that one electrostatic unit of charge is measured at saturation (when the secondary electrons are fully utilized and the wall effect of the chamber is avoided). It is most desirable, incidentally, to graft copolymerize all or substantially all of the N-vinyl lactam monomeric impregnant to and with the acrylonitrile polymer substrate while the mixture is being subject to the influence of the high energy radiation.

In general, the operable range of total irradiation dosage in the practice of the present invention is roughly from about 10,000 to about 200,000 rep. A preferred range of dosage is between about 20,000 and 40,00 rep. As will be appreciated by those who are skilled in the art, it is difficult to prescribe absolute operable limits with inflexible certainty. Ordinarily, lower doses are most convenient and economical to effect and handle. Lower doses also minimize the possibility of change or deterioration in the polymer substrate being modified. All other conditions being equal (and ignoring particular characteristics of the graft copolymer formed), greater total doses usually achieve greater total amounts of graft copolymer formed on the fiber. As is apparent, a significant and critical feature of the present invention lies in the utilization of relatively lower doses of high energy radiation for effectively increasing the dyeability of the acrylonitrile polymer substrates, particularly as compared with the significantly greater doses conventionally used heretofore in similar procedures. This is a matter of not insignificant consequence since it is known that doses of high energy radiation on the order of 200 million rep. have a definite adverse effect (including discoloration) on the physical properties of acrylonitrile polymers, particularly those intended for fiber and the like applications.

It is generally found in connection with the high energy irradiation that is utilized to form the graft copolymer-containing structures, that lower dose rates result in more efficient grafting performance. In other words, when lower dose rates are effected, more N-vinyl lactam graft copolymer may be provided on the acrylonitrile polymer substrate per rep. of high energy radiation that is absorbed. In addition, lower dose rates also tend to permit longer side chains of the graft copolymer to form on the substrate. This tends to improve the dye-receptivity of the polymer substrate at given contents of graft copolymer attached thereto, since longer chains of the N-vinyl lactam graft copolymer tend to have greater affinity for dyestuffs and greater dye-accepting potency. Advantageously, the dose rate that is utilized is a rate that is between about 1,000 and 50,000 rep. per minute, preferably between about 2,000 and 20,000 rep. per minute.

The modified polymer products, particularly filamentary products, prepared in accordance with the present invention have excellent physical properties and other desirable characteristics especially when they are obtained in a form that is suited for use as a textile material. The modified products have a high capacity for and are readily and satisfactorily dyeable to deep and level shades of coloration with any of a wide variety of dyestuffs. For example, they may be easily and successfully dyed according to conventional procedures using acid, vat, acetate, direct, naphthol and sulfur dyes. Such dyestuffs in addition to Calcodur Pink 2BL, by way of didactic illustration, as Calcocid Alizarine Violet, Sulfanthrene Red 3B, Amacel Scarlet BS, Naphthol ASMX, Fast Red TRN Salt and Immedial Bordeaux G may advantageously be employed for such purposes.

Other dyestuffs, by way of further illustration, that may be utilized beneficially on the graft copolymerized products of the invention include such direct cotton dyes as Chlorantine Fast Brown CLL, Chlorantine Fast Green 5BLL, Chlorantine Fast Red 7B, Pontamine Green GX Conc. 125 percent, Calcomine Black EXN Conc., Niagara Blue NR and Erie Fast Scarlet 4BA; such acid dyes as Anthraquinone Green GN, Anthraquinone Blue AB, Sulfonine Brown 2B, Sulfonine Yellow 2G, Neutracyl Brown RD, Xylene Milling Black 2B, Xylene Milling Blue FF, Xylene Fast Rubine 3GP PAT, Calcocid Navy Blue R Conc., Calcocid Fast Blue BL, Calcocid Milling Red 3R, Alizarine Levelling Blue 2R, Amacid Azo and Yellow G extra; such mordant-acid dyes as Alizarine Light Green GS, and Brilliant Alizarine Sky Blue BS PAT; such vat dyestuffs as Midland Vat Blue R Powder, Sulfanthrene Brown G Paste, Sulfanthrene Black PG Dbl., Sulfanthrene Blue 2B Dbl. Paste and Sulfanthrene Red 3B paste, Indigoaol Green IB Powder, a soluble vat dyestuff; such acetate dyes as Celliton Fast Brown 3RA Extra CF, Celliton Fast Rubine BA CF, Artisil Direct Black FKZ, Artisil Direct Navy SR, Artisil Direct Red 3BP, Celanthrene Pure Blue BRS 400 percent, Celanthrene Red 3RB Conc. Acetamine Orange 3R Conc. and Acetamine Yellow N; B-Naphthol 2-chloro-4-nitroaniline, an azoic dye; such sulfur dyes as Katigen Brilliant Blue GGS High Conc. and Indo Carbon CLFS; and premetalized dyestuffs including Cibalan Yellow GRL and Supralan Blue NB and the like.

The dyed products, especially textile fiber products, are generally lightfast and are well imbued with good resistance to crocking. In addition, dyed textile fiber products exhibit good washfastness despite repeated exposure and subjection to washing, laundering and dry cleaning treatments.

What is claimed is:

1. A method for improving the dyeability of acrylonitrile polymers that contain in the polymer molecule at least about 80 percent by weight of acrylonitrile which method comprises preparing an acrylonitrile polymer in aquagel form; incorporating a minor proportion of an N-vinyl lactam monomer in said aquagel; and subsequently exposing the monomer-impregnated acrylonitrile polymer aquagel substrate to a field of high energy ionizing radiation at a temperature between about 20 and 60° C. whereby said aquagel substrate is given a high energy dose at a rate between about 1,000 and 50,000 rep. per minute until a total dose of from about 10,000 to 200,000 rep. has been effected and an N-vinyl lactam graft copolymer has been formed on said acrylonitrile polymer substrate.

2. The method of claim 1, wherein the acrylonitrile polymer aquagel is in the form of a shaped article.

3. The method of claim 1, wherein the acrylonitrile polymer aquagel is in the form of a filamentary shaped article.

4. The method of claim 1, wherein said monomer-impregnated aquagel is exposed to said field of high energy radiation at a dose rate between about 2,000 and 20,000 rep. per minute until a total dosage of about 20,000 to 50,000 rep. has been effected.

5. The method of claim 1, wherein the temperature is between about 20 and 50° C.

6. The method of claim 1, wherein said N-vinyl lactam monomer is impregnated into said acrylonitrile polymer aquagel from a solution of said monomer.

7. A method according to the method set forth in claim 6, wherein said N-vinyl lactam monomer is impregnated from an aqueous solution.

8. A method according to the method set forth in claim 7, wherein said aqueous solution of N-vinyl lactam monomer contains between about 5 and 20 percent by weight of dissolved monomer.

9. A method according to the method set forth in claim 8, wherein said N-vinyl lactam monomer is N-vinyl pyrrolidone.

10. A method for improving the dyeability of acrylonitrile polymers that contain in the polymer molecule at least about 80 percent by weight of acrylonitrile, which method comprises preparing an acrylonitrile polymer in aquagel form; impregnating said aquagel with an aqueous solution of an N-vinyl lactam monomer until a minor proportion of said monomer is intimately incorporated in said aquagel; exposing the monomer-impregnated acrylonitrile polymer aquagel substrate to a field of high energy ionizing radiation at a temperature between about 20 and 60° C. whereby said aquagel substrate is given a high energy dose at a rate between about 1,000 and 50,000 rep. per minute until a total dose of from about 10,000 to 200,000 rep. has been effected and an N-vinyl lactam graft copolymer has been formed on said acrylonitrile polymer substrate; said impregnation of the monomer into said aquagel and said subsequent irradiation of said monomer-impregnated aquagel being performed in an atmosphere that is substantially free from oxygen.

11. The method of claim 10, wherein the oxygen content of the atmosphere in which said impregnation and said irradiation are performed is less than about 1 percent by volume.

12. The method of claim 10, wherein said monomer-impregnated aquagel is exposed to said field of high energy radiation at a dose rate between about 2,000 and 20,000 rep. per minute until a total dosage of about 20,000 to 50,000 rep. has been effected and wherein the temperature is between about 20 and 50° C.

13. The method of claim 10, wherein the pH of said aqueous solution of monomer is maintained between about 5 and 11.

14. The method of claim 10, wherein the pH of said aqueous solution of monomer is maintained between about 7 and 11.

15. The method of claim 10, and including the additional step of incorporating in said aqueous solution of monomer a minor proportion that is a quantity in the amount of up to about 1 percent by weight, based on the weight of said solution of an additive selected from the group consisting of alkali metal phosphates, phosphites, sulphates, sulphites, bisulphites and mixtures thereof.

16. A method in accordance with the method set forth in claim 15, wherein said additive is a mixture of sodium sulfite and sodium tribasic phosphate.

17. The method of claim 10, wherein said aquagel is in the form of a filamentary material, and wherein said monomer impregnating step is performed by drawing said filamentary aquagel structure through a bath of said aqueous solution of monomer and wherein said irradiation step is performed by drawing said monomer-impregnated filamentary shaped aquagel structure through said field of high energy radiation.

18. A method in accordance with the method set forth in claim 17, wherein said acrylonitrile polymer is polyacrylonitrile and said N-vinyl lactam monomer is N-vinyl pyrrolidone.

References Cited in the file of this patent

UNITED STATES PATENTS

| 2,713,573 | Schildknecht et al. | July 19, 1955 |
| 2,907,675 | Gaylord | Oct. 6, 1959 |

FOREIGN PATENTS

| 546,816 | Belgium | Apr. 6, 1956 |
| 66,034 | France | Dec. 12, 1955 |
| | (4th addition of No. 1,079,401) | |

OTHER REFERENCES

Ballantine et al.: "B.N.L. 317," pages 1–7, October 1954.

Brookhaven National Laboratory Report 375, page 26, April 1956.